(12) United States Patent
Koebel et al.

(10) Patent No.: US 6,680,030 B2
(45) Date of Patent: Jan. 20, 2004

(54) STRIPPING PROCESS WITH HORIZONTAL BAFFLES

(75) Inventors: Jeffrey P. Koebel, Lake Zurich, IL (US); Brian W. Hedrick, Rolling Meadows, IL (US); Kalidas Puppala, Northbrook, IL (US)

(73) Assignee: UOP LLC, Des Plaines, IL (US)

( * ) Notice: Subject to any disclaimer, the term of this patent is extended or adjusted under 35 U.S.C. 154(b) by 263 days.

(21) Appl. No.: 09/877,981

(22) Filed: Jun. 8, 2001

(65) Prior Publication Data

US 2001/0027938 A1 Oct. 11, 2001

Related U.S. Application Data

(63) Continuation-in-part of application No. 09/746,751, filed on Dec. 21, 2000.
(60) Provisional application No. 60/173,606, filed on Dec. 29, 1999.

(51) Int. Cl.[7] ............... B01J 8/18; B01J 2/00; B01J 38/22; B01D 53/02; B01D 53/06
(52) U.S. Cl. ............... 422/144; 422/139; 95/112; 95/122; 95/149; 95/159; 95/162; 96/130; 96/144; 96/145; 502/20; 502/45
(58) Field of Search ............... 95/149, 159, 162, 95/170, 93, 104, 111, 112, 122; 96/130, 144, 145; 502/20, 34, 45, 55; 422/139, 144

(56) References Cited

U.S. PATENT DOCUMENTS

| | | | |
|---|---|---|---|
| 2,440,620 A | 4/1948 | Taff | 23/288 |
| 2,472,502 A | 6/1949 | Tyson | 23/288 |
| 2,541,801 A | 2/1951 | Wilcox | 196/52 |
| 2,612,438 A | 9/1952 | Murphree | 23/288 |
| 2,994,659 A | 8/1961 | Slyngstad et al. | 208/113 |
| 3,894,932 A | 7/1975 | Owen | 208/74 |
| 4,364,905 A | 12/1982 | Fahrig et al. | 422/144 |
| 4,392,942 A * | 7/1983 | Wallman et al. | 208/410 |
| 4,414,100 A | 11/1983 | Krug et al. | 208/153 |
| 4,481,103 A | 11/1984 | Krambeck et al. | 208/120 |
| 4,500,423 A | 2/1985 | Krug et al. | 208/161 |
| 5,531,884 A | 7/1996 | Johnson et al. | 208/150 |
| 5,547,909 A * | 8/1996 | Carlson | 502/20 |
| 5,798,086 A * | 8/1998 | Erickson | 422/211 |
| 6,293,528 B1 | 9/2001 | Monkelbaan et al. | 261/114.1 |

FOREIGN PATENT DOCUMENTS

| | | |
|---|---|---|
| EP | 0482054 B1 | 9/1994 |
| GB | 2233663 A | 1/1991 |

* cited by examiner

Primary Examiner—Jerry D. Johnson
Assistant Examiner—Alexa A. Doroshenk
(74) Attorney, Agent, or Firm—John G. Tolomei; James C. Paschall (57) ABSTRACT

A baffle-style stripping arrangement for an FCC process having substantially horizontal stripping baffles is disclosed. The stripping baffles comprise a perforated section and a downcomer section which generates transverse movement of catalyst across the baffle to ensure adequate vertical movement of stripping media. The perforated section is covered with stripping openings to provide improved stripping efficiency and catalyst flux through the stripping vessel. The perforated section may comprise a grate. Baffles may also include an imperforate section which is vertically aligned with a downcomer section of a superjacent baffle.

15 Claims, 10 Drawing Sheets

STRIPPING PROCESS WITH HORIZONTAL BAFFLES

CROSS-REFERENCE TO RELATED APPLICATIONS

This application is a Continuation-In-Part of copending application Ser. No. 09/746,751 filed Dec. 21, 2000, which claims priority from Provisional Application Ser. No. 60/173,606 filed Dec. 29, 1999, the contents of which are hereby incorporated by reference.

BACKGROUND OF THE INVENTION

This invention relates to processes and apparatuses for the fluidized contacting of catalyst with hydrocarbons. More specifically, this invention relates to processes and apparatuses for stripping entrained or adsorbed hydrocarbons from catalyst particles.

DESCRIPTION OF THE PRIOR ART

A variety of processes contact finely divided particulate material with a hydrocarbon containing feed under conditions wherein a fluid maintains the particles in a fluidized condition to effect transport of the solid particles to different stages of the process. Catalyst cracking is a prime example of such a process that contacts hydrocarbons in a reaction zone with a catalyst composed of finely divided particulate material. The hydrocarbon feed fluidizes the catalyst and typically transports it in a riser as the catalyst promotes the cracking reaction. As the cracking reaction proceeds, substantial amounts of hydrocarbon, called coke, are deposited on the catalyst. A high temperature regeneration within a regeneration zone burns coke from the catalyst by contact with an oxygen-containing stream that again serves as a fluidization medium. Coke-containing catalyst, referred to herein as spent catalyst, is continually removed from the reaction zone and replaced by essentially coke-free catalyst from the regeneration zone. Fluidization of the catalyst particles by various gaseous streams allows the transport of catalyst between the reaction zone and regeneration zone. Methods for cracking hydrocarbons in a fluidized stream of catalyst, transporting catalyst between reaction and regeneration zones and combusting coke in the regenerator are well known to those skilled in the art of FCC processes. To this end, the art is replete with vessel configurations for contacting catalyst particles with feed and regeneration gas, respectively.

A majority of the hydrocarbon vapors that contact the catalyst in the reaction zone are separated from the solid particles by ballistic and/or centrifugal separation methods within the reaction zone. However, the catalyst particles employed in an FCC process have a large surface area, which is due to a great multitude of pores located in the particles. As a result, the catalytic materials retain hydrocarbons within their pores, upon the external surface of the catalyst and in the spaces between individual catalyst particles as they enter the stripping zone. Although the quantity of hydrocarbons retained on each individual catalyst particle is very small, the large amount of catalyst and the high catalyst circulation rate which is typically used in a modern FCC process results in a significant quantity of hydrocarbons being withdrawn from the reaction zone with the catalyst.

Therefore, it is common practice to remove, or strip, hydrocarbons from spent catalyst prior to passing it into the regeneration zone. Greater concentrations of hydrocarbons on the spent catalyst that enters the regenerator increase its carbon-burning load and result in hotter regenerator temperatures. Avoiding the unnecessary burning of hydrocarbons is especially important during the processing of heavy (relatively high molecular weight) feedstocks, since processing these feedstocks increases the deposition of coke on the catalyst during the reaction (in comparison to the coking rate with light feedstocks) and raises the temperature in the regeneration zone. Improved stripping permits cooler regenerator temperatures. Stripping hydrocarbons from the catalyst also allows recovery of the hydrocarbons as products.

The most common method of stripping the catalyst passes a stripping gas, usually steam, through a flowing stream of catalyst, counter-current to its direction of flow. Such steam stripping operations, with varying degrees of efficiency, remove the hydrocarbon vapors which are entrained with the catalyst and adsorbed on the catalyst. Contract of the catalyst with a stripping medium may be accomplished in a simple open vessel as demonstrated by U.S. Pat. No. 4,481,103 B1.

The efficiency of catalyst stripping is increased by using vertically spaced baffles to cascade the catalyst from side to side as it moves down a stripping apparatus and counter-currently contacts a stripping medium. Moving the catalyst horizontally increases contact between the catalyst and the stripping medium so that more hydrocarbons are removed from the catalyst. In these arrangements, the catalyst is given a labyrinthine path through a series of baffles located at different levels. Catalyst and gas contact is increased by this arrangement that leaves no open vertical path of significant cross-section through the stripping apparatus. Further examples of these stripping devices for FCC units are shown in U.S. Pat. No. 2,440,620 B1, U.S. 2,612,438 B1, U.S. 3,894,932 B1, U.S. 4,414,100 B1 and U.S. 4,364,905 B1. These references show the typical stripping vessel arrangement having a stripping vessel, a series of outer baffles in the form of frusto-conical sections that direct the catalyst inwardly onto a series of inner baffles. The inner baffles are centrally located conical or frusto-conical sections that divert the catalyst outwardly onto the outer baffles. The stripping medium enters from below the lower baffles and continues rising upwardly from the bottom of one baffle to the bottom of the next succeeding baffle. Variations in the baffles include the addition of skirts about the trailing edge of the baffle as depicted in U.S. Pat. No. 2,994,659 B1 and the use of multiple linear baffle sections at different baffle levels as demonstrated in FIG. 3 of U.S. Pat. No. 4,500,423 B1. A variation in introducing the stripping medium is shown in U.S. Pat. No. 2,541,801 B1 where a quantity of fluidizing gas is admitted at a number of discrete locations.

Currently in stripping vessels for FCC units, the baffles are typically oriented to have an angle of 45° with respect to the horizontal. The sloped baffles assure that catalyst moves off the tray down to the next level in the stripping vessel. However, because the sloped trays each occupy substantial elevation, they limit the number of trays that can be installed in a given height of a stripping vessel. The greater the number of trays in the stripping vessel, the greater the overall performance. Moreover, sloped baffles generate a differential pressure head between holes that are lower in elevation on a baffle compared to the holes which are higher in elevation on the baffle. Because the pressure is going to be greater at lower elevations on the baffle, the velocity through the jets on the baffle will be greater at higher elevations on the baffle. This makes hydraulics through the stripping vessel more difficult to control. Moreover, erosion occurs through the jets which are higher on the baffle than through jets that are lower on the baffle because of the velocity differential. Consequently, the variously eroded holes exacerbate the difficulty in controlling hydraulics. On the other hand, setting baffles at a smaller slope will result in catalyst accumulation on top of the baffle unless fluidization over the baffle is increased, which could require increasing the flow rate of stripping medium.

It is an objective of any new stripping design to minimize the addition of stripping medium while maintaining the benefits of good catalyst stripping throughout the FCC process unit. In order to achieve good stripping of the catalyst with the resultant increased product yield and enhanced regenerator operation, relatively large amounts of stripping medium have been required. For the most common stripping medium, steam, the average requirement throughout the industry is about 2 kg of steam per 1000 kg (2 lbs. of steam per 1000 lbs.) of catalyst for catalyst stripping. In the case of steam, the costs include capital expenses and utility expenses associated with supplying the steam and removing the resulting water via downstream separation facilities. Where there is not adequate supply or treatment capacity, the costs associated with raising the addition of stripping medium can be significant. In such cases, achieving better stripping without an increase in the required steam will yield substantial economic benefits to the FCC process.

However, better stripping brings more important economic benefits to the FCC process by reducing "delta coke". Delta coke is the weight percent coke on spent catalyst less the weight percent coke on regenerated catalyst. Reducing delta coke in the FCC process permits a lowering of the regenerator temperature. More of the resulting, relatively cooler regenerated catalyst is required to supply the fixed heat load in the reaction zone. Hence, the reaction zone may operate at a higher catalyst-to-feed or catalyst-to-oil (C/O) ratio. The higher C/O ratio increases conversion which increases the production of valuable products. Consequently, improved stripping results in improved conversion. A stripping operation that reduces the production of delta coke by 0.05 wt-% can lower the regenerator temperature by −9° to −7° C. (15° to 20° F.) and permit a C/O ratio increase in the range of 6%. The corresponding improvement in conversion yields 0.6 to 0.7 vol-% more gasoline as well also increasing the yield of desired light products. Therefore, it is a further objective of this invention to decrease delta coke by more efficient catalyst stripping.

Moreover, it is not possible to simply increase stripping efficiency or capacity by accepting the economic penalties associated with the use of increasing amounts of steam. At some point, the typical stripping vessel that operates with baffles becomes limited by the amount of catalyst flux moving through the stripping vessel. A practical limit on catalyst flux for operating such stripping vessels is approximately 439,380 kg/hr/m$^2$ (90,000 lbs/hr/ft$^2$) based on total area of the stripping vessel. Attempts have been made to increase the capacity and effectiveness of stripping in a baffle-style stripping unit by modifying the configuration and area of the baffles. U.S. Pat. No. 5,531,884 B1 shows a modification to a baffle-style stripping vessel that incorporates one or more rings of large vertical conduits to provide an additional catalyst and gas circulation path across the baffles. It is also known to concentrate openings in a very centralized portion of the stripping baffles.

BRIEF SUMMARY OF THE INVENTION

It has now been found that providing a stripping vessel having horizontal baffles with downcomers will provide improved stripping efficiency and catalyst flux through the stripping vessel. It was also unexpectedly found that the stripping efficiency increases with higher catalyst flux when using the horizontal baffles with downcomers of this invention. The utilization of downcomers generates sufficient transverse movement of the catalyst across each baffle to allow the stripping medium to rise through the catalyst and provide better mixing. Completely distributing relatively small openings over the entire surface of a section of the baffle has been found to sufficiently fluidize catalyst on the baffle at high catalyst flux rates. Moreover, more horizontal baffles can be installed in a stripping vessel of a given height, thereby improving stripping performance. By this discovery, previous limits for typical baffle-type stripping vessel throughput may be increased by at least 22% by installing inexpensive stripping baffles. The process of this invention has benefits at all flux rates, has particular benefits at flux rates of at least 292,920 kg/hr/m$^2$ (60,000 lbs/hr/ft$^2$) of stripping vessel area and is particularly useful at flux rates of at least 537,020 kg/hr/m$^2$ (110,000 lbs/hr/ft$^2$) of stripping vessel area. Moreover, the improved stripping design achieves high stripping efficiencies at very low steam rates, which reduces overall FCC unit operating costs.

In one embodiment, the present invention relates to a process for the stripping of entrained and/or adsorbed hydrocarbons from particulate material in a stripping vessel. The process comprises contacting particles with a hydrocarbon stream. Hydrocarbons are disengaged from the particles after contact with the hydrocarbon stream to produce a stream of contacted particles containing entrained or adsorbed hydrocarbons. The contacted particles are passed downwardly through a plurality of stripping baffles. Each baffle has a slope of less than or equal to 10° with respect to the horizontal and extends across less than the entire cross sectional area of the stripping vessel to define a downcomer section. A stripping fluid is discharged upwardly through a plurality of openings distributed over each stripping baffle to strip hydrocarbons from the particulate material. Stripping fluid, stripped hydrocarbons and stripped particles are recovered from the stripping baffles.

In another embodiment, the present invention relates to an apparatus for the stripping of entrained and/or adsorbed hydrocarbons from particulate material. The apparatus comprises a stripping vessel. The stripping vessel defines at least one port for receiving particles that contain entrained or adsorbed hydrocarbons from the contact of the particles with a hydrocarbon stream and for withdrawing stripping fluid and stripped hydrocarbons from the stripping vessel. A plurality of stripping baffles are spaced apart vertically over at least a portion of the stripping vessel height with each baffle having a slope of no more than 10°. Each of the stripping baffles extends over less than the entire horizontal, cross-sectional area of the stripping vessel to define a downcomer section. A plurality of openings are distributed over the surface of each stripping baffle. The apparatus comprises at least one fluid inlet for passing a stripping fluid to the underside of at least one stripping baffle for stripping hydrocarbons from the particulate material and at least one particle outlet for recovering stripped particles from the stripping baffles.

In a further embodiment, the present invention relates to an apparatus for the stripping of entrained and/or adsorbed hydrocarbons from particulate material. The apparatus comprises a stripping vessel. The stripping vessel defines at least one port for receiving particles that contain entrained or adsorbed hydrocarbons from the contact of the particles with a hydrocarbon stream and for withdrawing stripping fluid and stripped hydrocarbons from the stripping vessel. A plurality of stripping baffles are spaced apart vertically over at least a portion of the stripping vessel height with each baffle having a slope of no more than 10°. Each of the stripping baffles extend over less than the entire horizontal, cross-sectional area of the stripping vessel to define a downcomer section. A plurality of openings are distributed over the surface of each stripping baffle. The apparatus comprises at least one fluid inlet for passing a stripping fluid to the underside of at least one stripping baffle for stripping hydrocarbons from the particulate material and at least one particle outlet for recovering stripped particles from the stripping baffles.

Accordingly, it is an object of this invention to increase the maximum capacity at which a baffle-style stripping vessel may operate.

It is another object of this invention to increase the efficiency of stripping in a baffle style stripping vessel.

It is a further object of this invention to obtain a method and apparatus that provides a more complete and reduced utilization of stripping medium.

Additional objects, embodiments and details of this invention are given in the following detailed description of the invention.

DETAILED DESCRIPTION OF THE INVENTION

Looking first at a more complete description of the FCC process, the typical feed to an FCC unit is a gas oil such as a light or vacuum gas oil. Other petroleum-derived feed streams to an FCC unit may comprise a diesel boiling range mixture of hydrocarbons or heavier hydrocarbons such as reduced crude oils. It is preferred that the feed stream consist of a mixture of hydrocarbons having boiling points, as determined by the appropriate ASTM test method, above about 230° C. (446° F.) and more preferably above about 290° C. (554° F.). It is becoming customary to refer to FCC-type units which are processing heavier feedstocks, such as atmospheric reduced crudes, as residual crude cracking units, or resid cracking units. The process and apparatus of this invention can be used for either FCC or residual cracking operations. For convenience, the remainder of this specification will only make reference to the FCC process.

An FCC process unit comprises a reaction zone and a catalyst regeneration zone. In the reaction zone, a feed stream is contacted with a finely divided fluidized catalyst maintained at an elevated temperature and at a moderate positive pressure. In this invention, contacting of feed and catalyst usually takes place in a riser conduit, but may occur in any effective arrangement such as the known devices for short contact time contacting. In the case of a riser, it comprises a principally vertical conduit as the main reaction site, with the effluent of the conduit emptying into a large volume process vessel, which is called the reactor vessel or may be referred to as a separation vessel. The residence time of catalyst and hydrocarbons in the riser needed for substantial completion of the cracking reactions is only a few seconds or less. The flowing vapor/catalyst stream leaving the riser may pass from the riser to a solids-vapor separation device located within the separation vessel or may enter the separation vessel directly without passing through an intermediate separation apparatus. When no intermediate apparatus is provided, much of the catalyst drops out of the flowing vapor/catalyst stream as the stream leaves the riser and enters the separation vessel. One or more additional solids/vapor separation devices, almost invariably a cyclone separator, is normally located within and at the top of the large separation vessel. The products of the reaction are separated from a portion of catalyst which is still carried by the vapor stream by means of the cyclone or cyclones and the vapor is vented from the cyclone and separation zone. The spent catalyst falls downward to a lower location within the separation vessel. A stripping zone is usually located near a lower part of the reactor vessel to remove hydrocarbons from the catalyst and comprises a stripping vessel separate from the riser and reactor vessel. Catalyst is transferred to a separate regeneration zone after it passes through the stripping vessel.

The rate of conversion of the feedstock within the reaction zone is controlled by regulation of the temperature, activity of the catalyst and quantity of the catalyst (i.e., catalyst-to-oil ratio) maintained within the reaction zone. The most common method of regulating the temperature in the reaction zone is by regulating the rate of circulation of catalyst from the regeneration zone to the reaction zone, which simultaneously changes the catalyst-to-oil ratio. That is, if it is desired to increase the conversion rate within the reaction zone, the rate of flow of catalyst from the regeneration zone to the reaction zone is increased. This results in more catalyst being present in the reaction zone for the same volume of oil charged thereto. Since the temperature within the regeneration zone under normal operations is considerably higher than the temperature within the reaction zone, an increase in the rate of circulation of catalyst from the regeneration zone to the reaction zone results in an increase in the reaction zone temperature.

The chemical composition and structure of the feed to an FCC unit will affect the amount of coke deposited upon the catalyst in the reaction zone. Normally, the higher the molecular weight, Conradson carbon, heptane insolubles and carbon-to-hydrogen ratio of the feedstock, the higher will be the coke level on the spent catalyst. Greater conversion also increases the coke level on spent catalyst. Also, high levels of combined nitrogen, such as found in shale-derived oils, will increase the coke level on spent catalyst. Processing of heavier feedstocks, such as deasphalted oils or atmospheric bottoms from a crude oil fractionation unit (commonly referred to as reduced crude) results in an increase in some or all of these factors and therefore causes an increase in the coke level on spent catalyst. As used herein, the term "spent catalyst" is intended to indicate catalyst employed in the reaction zone which is being transferred to the regeneration zone for the removal of coke deposits. The term is not intended to be indicative of a total lack of catalytic activity by the catalyst particles. The term "used catalyst" is intended to have the same meaning as the term "spent catalyst".

The reaction zone, which is normally referred to as a "riser" due to the widespread use of a vertical tubular conduit, is maintained at high temperature conditions which generally include a temperature above about 425° C. (797° F.). Preferably, the reaction zone is maintained at cracking conditions which include a temperature of from about 480° to about 590° C. (896° to 1094° F.) and a pressure of from about 65 to 500 kPa (9.4 to 72.5 psia) but preferably less than about 275 kPa (39.9 psia). The catalyst-to-oil ratio, based on the weight of catalyst and feed hydrocarbons entering the bottom of the riser, may range up to 20:1 but is preferably between about 4:1 and about 10:1. Hydrogen is not normally added to the riser, although hydrogen addition is known in the art. On occasion, steam may be passed into the riser. The average residence time of catalyst in the riser is preferably less than about 5 seconds. The type of catalyst employed in the process may be chosen from a variety of commercially available catalysts. A catalyst comprising a zeolite base material is preferred, but the older style amorphous catalyst can be used if desired. Further information on the operation of FCC reaction zones may be obtained from U.S. Pat. No. 4,541,922 B1, U.S. 4,541,923 B1 and the patents cited above.

In an FCC process, catalyst is continuously circulated from the reaction zone to the regeneration zone and then again to the reaction zone. The catalyst therefore acts as a vehicle for the transfer of heat from zone to zone as well as providing the necessary catalytic activity. Any FCC catalyst can be used for the process. The particles will typically have a size of less than 100 microns. Catalyst which is being withdrawn from the regeneration zone is referred to as "regenerated" catalyst. As previously described, the catalyst charged to the regeneration zone is brought into contact with an oxygen-containing gas such as air or oxygen-enriched air under conditions which result in combustion of the coke. This results in an increase in the temperature of the catalyst and the generation of a large amount of hot gas which is removed from the regeneration zone as a gas stream referred to as a flue gas stream. The regeneration zone is normally operated at a temperature of from about 600° C. (1112° F.) to about 800° C. (1472° F.). Additional information on the operation of FCC reaction and regeneration zones may be obtained from U.S. Pat. No. 4,431,749 B1, U.S. 4,419,221 B1 and U.S. 4,220,623 B1.

The catalyst regeneration zone is preferably operated at a pressure of from about 35 to 500 kPa (5.1 to 72.5 psia). The spent catalyst being charged to the regeneration zone may contain from about 0.2 to about 15 wt-% coke. This coke is predominantly comprised of carbon and can contain from about 3 to 15 wt-% hydrogen, as well as sulfur and other elements. The oxidation of coke will produce the common combustion products: carbon dioxide, carbon monoxide and water. As known to those skilled in the art, the regeneration zone may take several configurations, with regeneration being performed in one or more stages. Further variety is possible due to the fact that regeneration may be accomplished with the fluidized catalyst being present as either a dilute phase or a dense phase within the regeneration zone. The term "dilute phase" is intended to indicate a catalyst/gas mixture having a density of less than 300 kg/m$^3$ (18.7 lb/ft$^3$). In a similar manner, the term "dense phase" is intended to mean that the catalyst/gas mixture has a density equal to or more than 300 kg/m$^3$ (18.7 lb/ft$^3$). Representative dilute phase operating conditions often include a catalyst/gas mixture having a density of about 15 to 150 kg/m$^3$ (0.9 to 9.4 lb/ft$^3$).

Figures 1, 2:
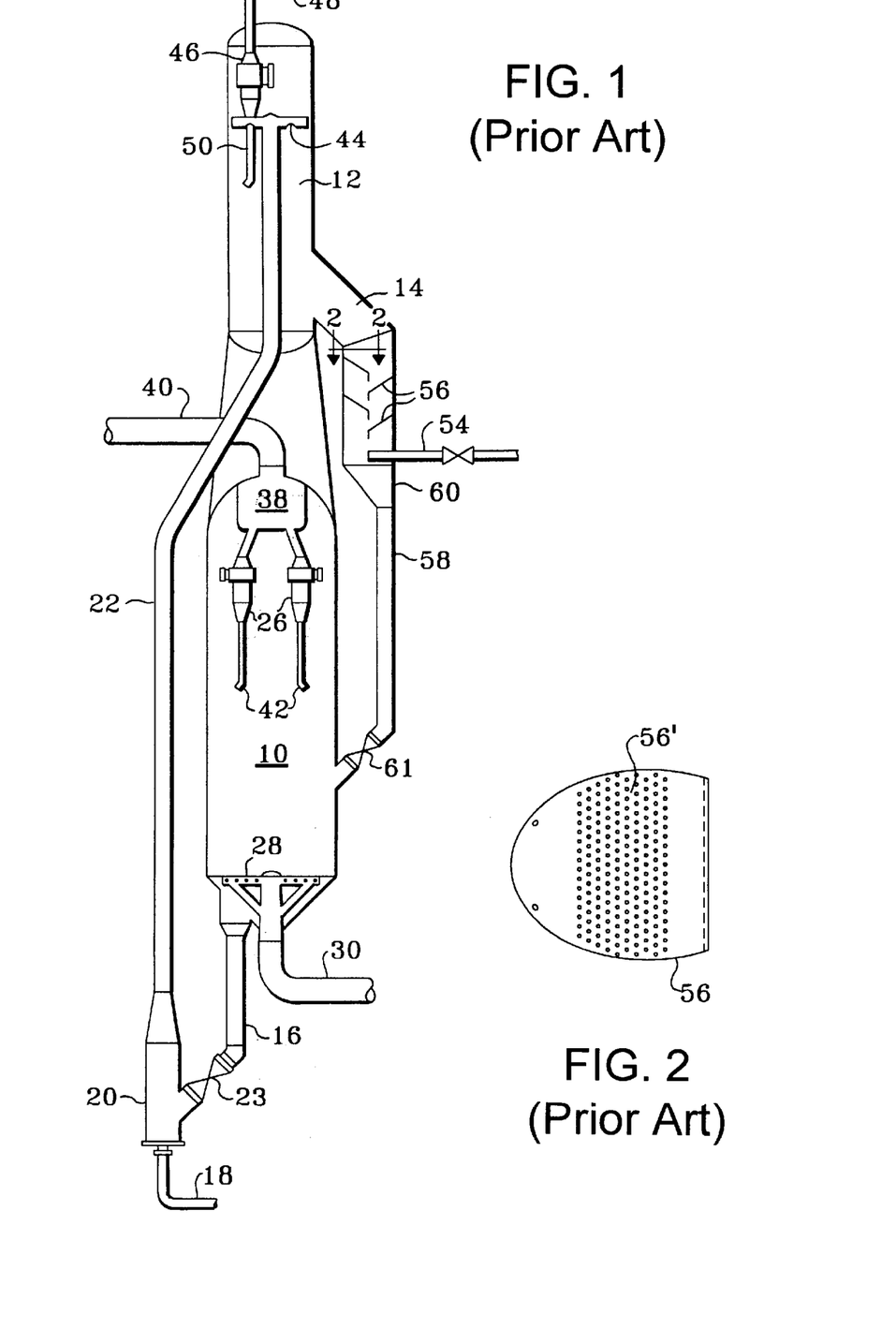
FIG. 1 is representative of the prior art and shows a schematic elevation view of a stacked FCC regenerator-reactor and stripping arrangement.
FIG. 2 is a horizontal section taken across the stripping vessel of FIG. 1.

FIG. 1 shows a stacked FCC configuration to which the method of this invention may be applied. The stacked FCC arrangement represents only one of many FCC arrangements to which this invention can be applied. Looking then at FIG. 1, a traditional stacked FCC arrangement will have a regenerator 10, a reactor or upper vessel 12 and a stripping or side vessel 14. A regenerated catalyst conduit 16 transfers catalyst from the regenerator through a control valve 23 and into a lower riser conduit 20 where it contacts hydrocarbon feed entering the riser through hydrocarbon feed conduit 18. Conduit 18 may also contain a fluidizing medium such as steam which is added with the feed. Expanding gases from the feed and fluidizing medium convey catalyst up the riser and into riser 22. As the catalyst and feed pass up to the riser, the hydrocarbon feed cracks to lower boiling hydrocarbon products. Riser 22 discharges the catalyst and hydrocarbon mixture through openings 44 to effect an initial disengagement of catalyst and hydrocarbon vapors. Outside openings 44, a majority of the hydrocarbon vapors continue to move upwardly into the inlet of cyclone separator 46 which effects a near complete removal of catalyst from hydrocarbon vapors. Separated hydrocarbon vapors exit reactor 12 through an overhead conduit 48 while a discharge leg 50 returns separated catalyst to a lower portion of the reactor vessel. Catalyst from riser openings 44 and discharge leg 50 collects in a lower portion of the reactor and supplies catalyst to stripping vessel 14. Steam enters stripping vessel 14 through an inlet provided by a conduit 54 and rises counter-current to a downward flow of catalyst through the stripping vessel thereby removing adsorbed hydrocarbons from the catalyst which flow upwardly through and are ultimately recovered with the steam by cyclone separator 46. In order to facilitate hydrocarbon removal, a series of downwardly sloping baffles 56 are provided in the stripping vessel 14. A spent catalyst conduit 58 removes catalyst from a lower conical section 60 of stripping vessel 14. A control valve 61 regulates the flow of catalyst from conduit 58.

Regeneration gas, such as compressed air, enters regenerator 10 through a conduit 30. An air distributor 28 disperses air over the cross-section of regenerator 10 where it contacts spent catalyst. Coke is removed from the catalyst by combustion with oxygen from distributor 28. Combustion by-products and unreacted air components rise upwardly along with entrained catalyst through the regenerator into the inlets of cyclones 26. Relatively catalyst-free gas collects in an internal chamber 38 which communicates with a gas conduit 40 and removing spent regeneration gas from the regenerator. Catalyst, separated by the cyclones, drops from the separators through discharge legs 42 and returns to a bed (not shown) in the lower portion of regenerator 10.

FIG. 2 shows a plan view of a sloped stripping baffle. The relatively narrow band 56' over which the large number of holes are centralized is only about equal in width to the nominal radius of the stripping vessel. Thus, even when the largest number of holes were provided, large areas of unperforated sections still exist over the sloped surface.

Figure 3:
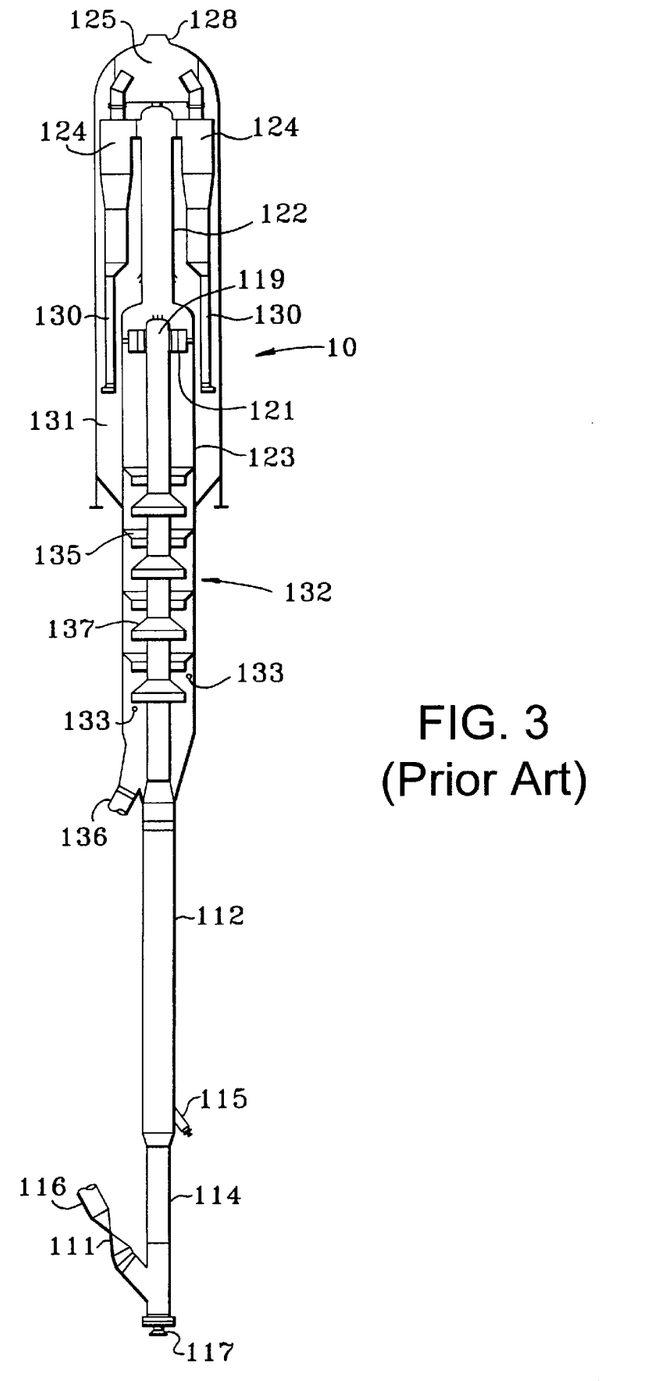
FIG. 3 is a schematic elevational view of an alternate arrangement for an FCC reactor.

FIG. 3 shows a more modern FCC configuration that uses a concentric riser and stripping vessel. The reactor arrangement in FIG. 3 operates in essentially the same manner as the reactor and riser shown in FIG. 1. A regenerator standpipe 116 transfers catalyst from a regenerator (not shown) at a rate regulated by a slide valve 111. A fluidization medium from nozzle 117 transports catalyst upwardly through a lower riser portion 114 at a relatively high density until a plurality of feed injection nozzles 115 (only one is shown) inject feed across the flowing stream of catalyst particles. The resulting mixture continues upward through an upper riser 112 until a pair of disengaging arms 121 tangentially discharge the mixture of gas and catalyst from a top 119 of the riser into a disengaging chamber 123 that effects separation of gases from the catalyst. A transport conduit 122 carries the hydrocarbon vapors and entrained catalyst to one or more cyclones 124 that separates spent catalyst from the hydrocarbon vapor stream. A collection chamber 125 gathers the separated hydrocarbon vapor streams from the cyclones for passage to an outlet nozzle 128 and into a fractionation zone (not shown). Diplegs 130 discharge catalyst from cyclones 124 into a lower portion of a collection space 131 that eventually passes the catalyst and adsorbed or entrained hydrocarbons into stripping zone 132 across ports (not shown) defined by the bottom of disengaging chamber 123. Catalyst separated in disengaging chamber 123 passes directly into stripping zone 132. The stripping gas enters a lower portion of the stripping zone 132 through an inlet 133. Inlet 133 may supply the stripping gas to one or more distributors (not shown) that distribute the gas around the circumference of the baffle. The spent catalyst leaves the stripping zone through a reactor conduit 136 and passes into the regeneration zone. As the catalyst passes through stripping zone 132, it contacts a series of outer baffles 135 and inner baffles 137.

Figure 4:
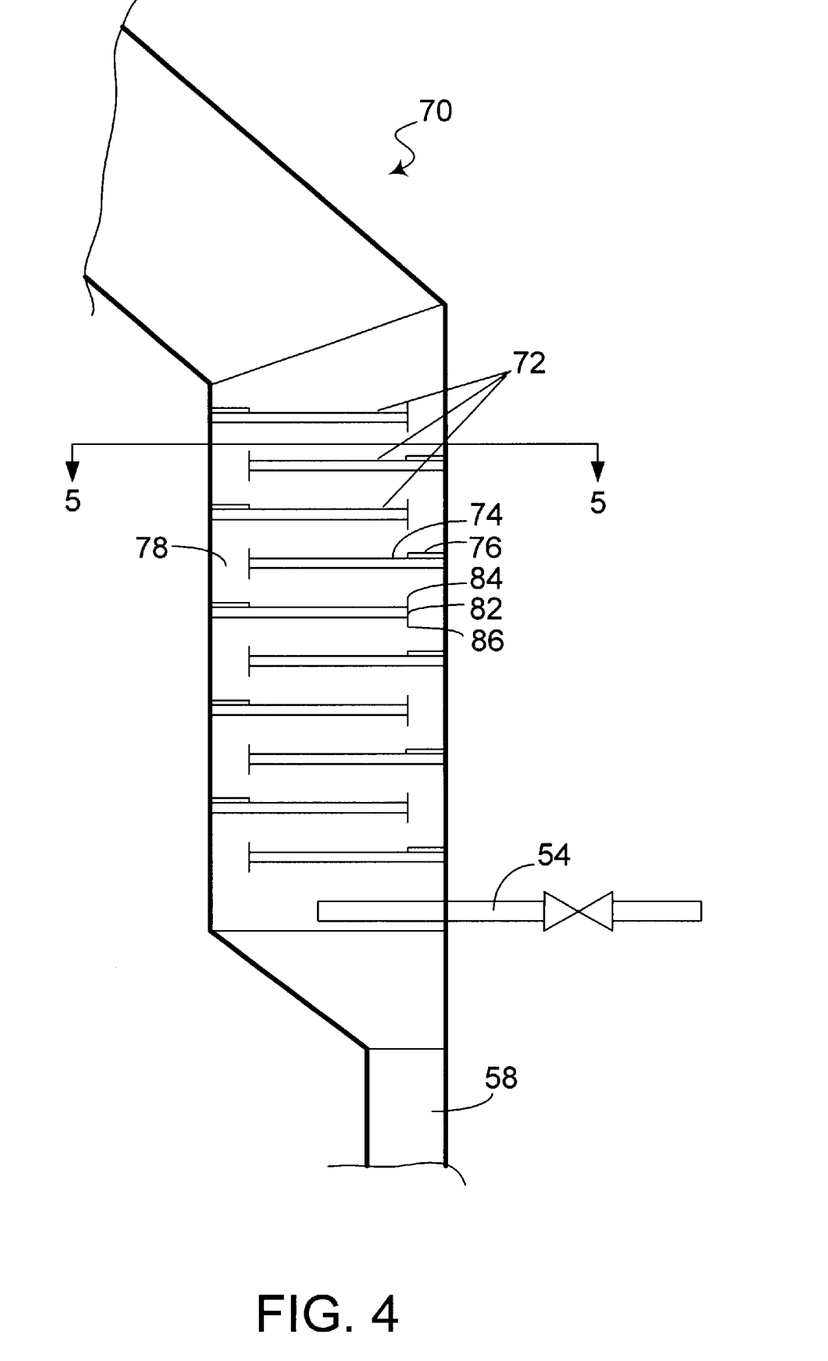
FIG. 4 is a partial schematic elevational view of a modified stripping vessel for replacement of a stripping vessel shown in FIG. 1.

FIG. 4 depicts a modified stripping vessel 70 of the present invention that would replace the stripping vessel 14 in FIG. 1. Elements in FIG. 4 that are the same as in FIG. 1 retain the same reference numerals as in FIG. 1. The stripping vessel 70 comprises a series of substantially horizontal baffles 72. The baffles 72 may have as much as a 10° slope for drainage during shutdown. Each baffle includes a perforated section 74, an optional imperforate section 76 and a downcomer section 78.

Figure 5:
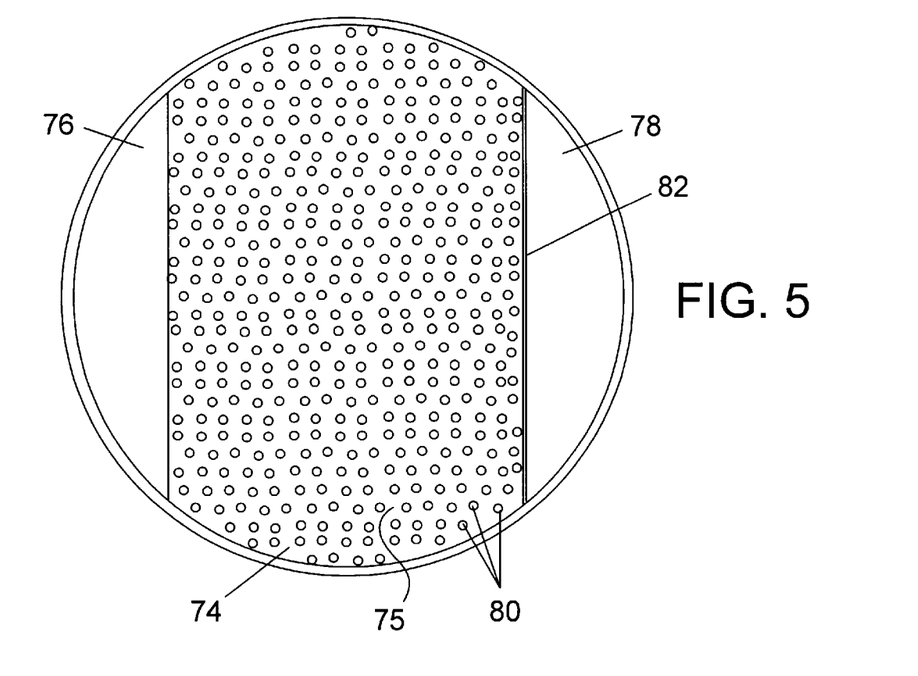
FIG. 5 is a cross-sectional view of the baffle for the stripping vessel of FIG. 4 taken at segment 5—5 in FIG. 4.

As shown in FIG. 5, the perforated section 74 includes numerous openings 80 drilled into a plate 75. An embodiment of this invention is the distribution of the baffle openings over the entire area of the perforated section of the baffles. The spacing of the perforations over the perforated section may be arranged in any manner that eliminates wide bands or areas that do not contain holes for delivery of the fluidization medium. The hole distribution beneficial to this invention can be described by a maximum circular area that contains at least one opening. Generally, any circular area of at least 0.09 m² (1 ft²) preferably surrounds at least a portion of one or more openings in that area. The circular area that can be circumscribed without enclosing a hole preferably should not exceed 0.05 m² (0.5 ft²). Following this type of criteria for the minimum geometry of an area that must contain a perforation will facilitate sufficient fluidization.

Figure 6:
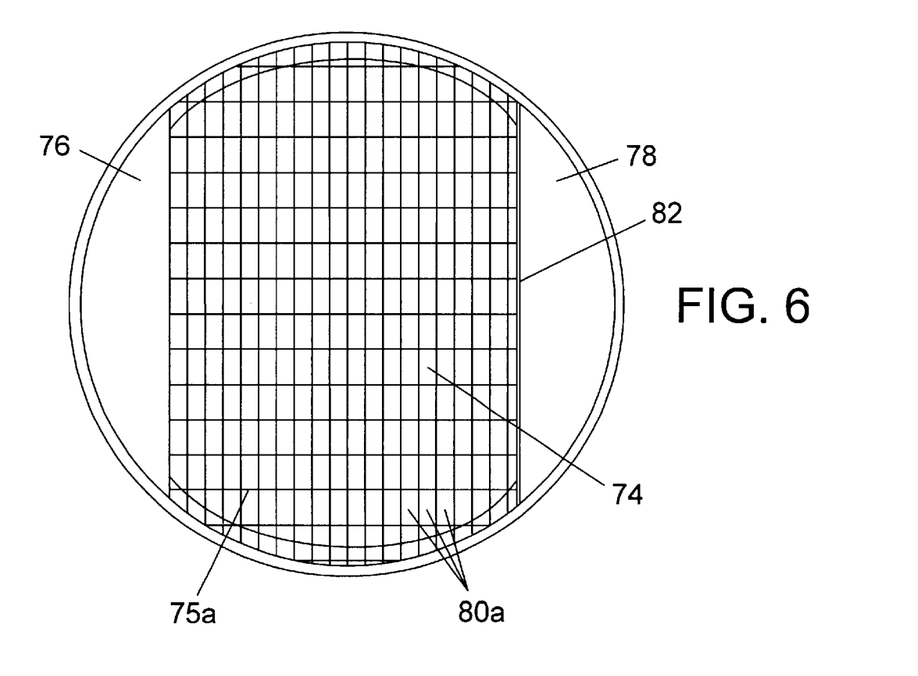
FIG. 6 is a cross-sectional view of an alternative baffle for the stripping vessel of FIG. 4 taken at segment 5—5 in FIG. 4.

On the other hand in an embodiment, the perforated section 74 may comprise a grating 75a defining openings 80a as shown in FIG. 6. The grating 75a may comprise a grid of elongated strips intersecting each other through major sides of each of the elongated strips. In another embodiment, the grating 75a may comprise a series of elongated strips running in parallel with a series of parallel or patterned rods resting on top of the elongated strips. One of ordinary skill in the art will be well acquainted with several ways of making the perforated section 74. However, it will be important that 35% of the area of the perforated section 74 comprise openings to allow the passage of stripping medium therethrough and diminish formation of gas bubbles underneath the baffle 72. The imperforate section 76 comprises a blank-off plate which rests on top of the perforated section 74 of the baffle 72. Preferably, the blank-off plate comprising the imperforate section 76 is secured to the perforated section 74. The baffle 72 does not extend across the entire cross-section of the stripping vessel 70 to thereby define the downcomer section 78 between an edge of the baffle 72 and an inner wall of the stripping vessel 70. An end plate 82 is attached to the edge of the baffle. In an embodiment, the end plate 82 extends upwardly from the edge of the baffle to define a weir 84 for regulating the amount of catalyst that accumulates on top of the baffle 72. In another embodiment, the end plate 82 extends downwardly from the edge of the baffle 72 to define a skirt 86 which may serve to regulate the amount of any gas which may accumulate under the baffle 72.

Arranging the downcomer section 78 on opposite sides of the stripping vessel 70 on adjacent baffles 72 assures that the catalyst moves downwardly through the stripping vessel 70 from side to side. The perforated section 74, with a high percentage of open area, allows the stripping medium to rise vertically upwardly through the stripping vessel 70 through succeeding baffles 72 to engage the horizontally flowing catalyst going downwardly in the stripping vessel 70 in a transverse manner to promote better mixing between the stripping medium and the catalyst. Hence, each baffle 72 has a higher efficiency. Moreover, because more baffles 72 can be installed into a given height of a stripping vessel, the overall stripping vessel will have a better efficiency than the stripping vessel 14 with conventionally sloped baffles 56.

In an embodiment, the height of the separation between each succeeding tray is between 31 and 76 cm (12 and 30 inches) apart. In a preferred embodiment, the height of separation between succeeding trays is 61 cm (24 inches) apart but it may also be preferred to reduce the height to 46 cm (18 inches) apart to pack more baffles into the stripping vessel 70.

In another embodiment, the downcomer section 78 comprises 10–30% of the entire cross-sectional area of the stripping vessel 70 with 20% being preferred. The imperforate section 76 which further promotes the horizontal movement of the catalyst by forcing it to change direction after coming through a superjacent downcomer section 78 comprises between 10% and 30% of the cross-sectional area of the stripping vessel 70 with 20% being preferred. The perforated section 74 of the baffle 72 in an embodiment comprises 40% to 80% of the cross-sectional area of the stripping vessel 70 with 60% being preferred. Although in an embodiment the perforated section 74 is at least 35% open to the flow of rising stripping medium, it is preferred that 70% of the perforated section 74 comprise openings.

In an embodiment, the baffles are typically formed from alloy steels that will stand up to the high temperature conditions in the reaction zone. Such steels are often subject to erosion and the baffles may benefit from the use of inserts or nozzles to define the openings and provide resistance to the erosive conditions imposed by the circulation of catalyst over the top of the baffle. Furthermore, the baffles are routinely covered with a refractory material that provides additional erosion resistance. Details of abrasion-resistant nozzles and refractory linings are well known to those skilled in the art of particle transport.

Figure 7:
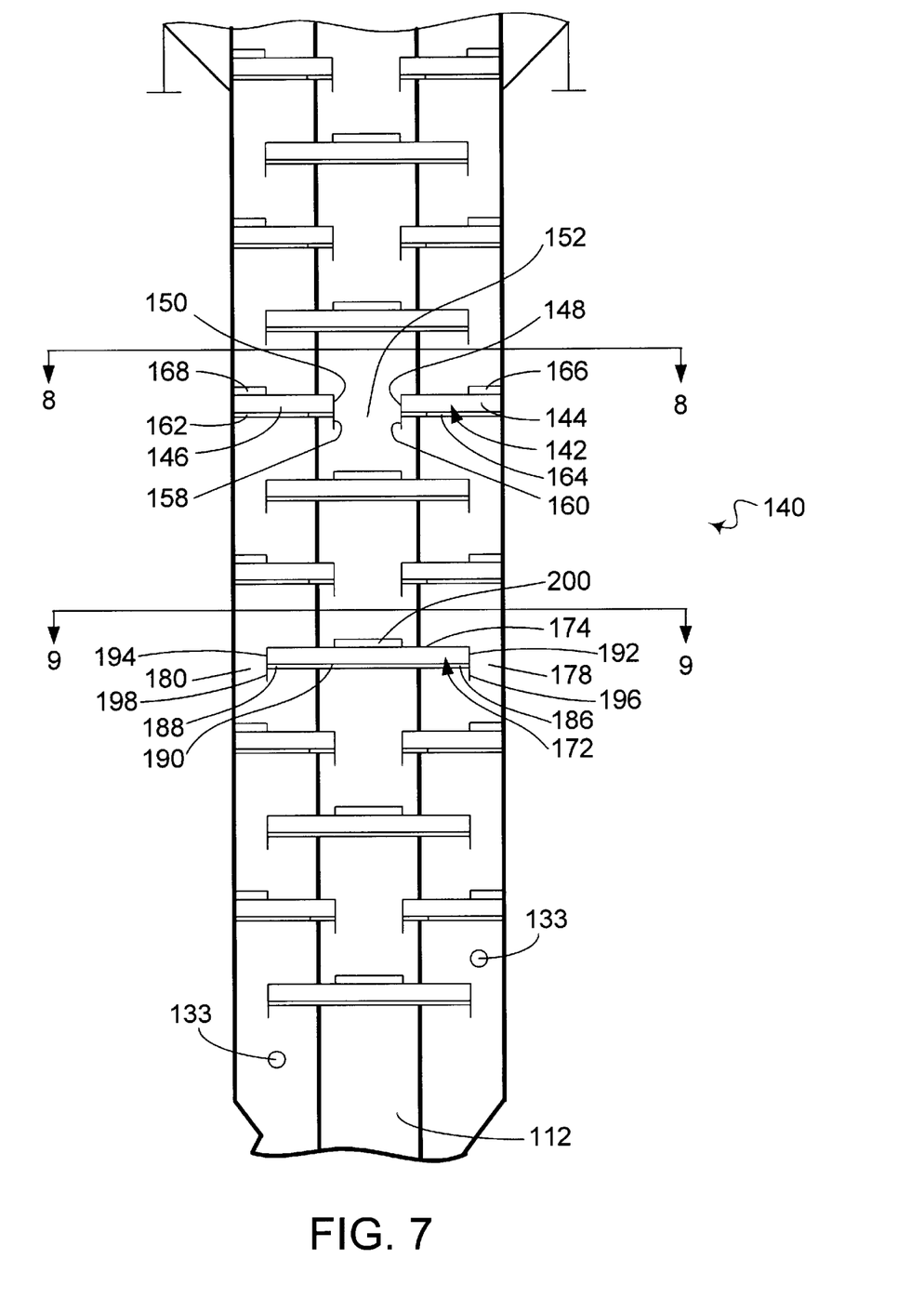
FIG. 7 is a partial schematic elevational view of a modified stripping vessel for replacement of a stripping vessel shown in FIG. 3.
Figure 8:
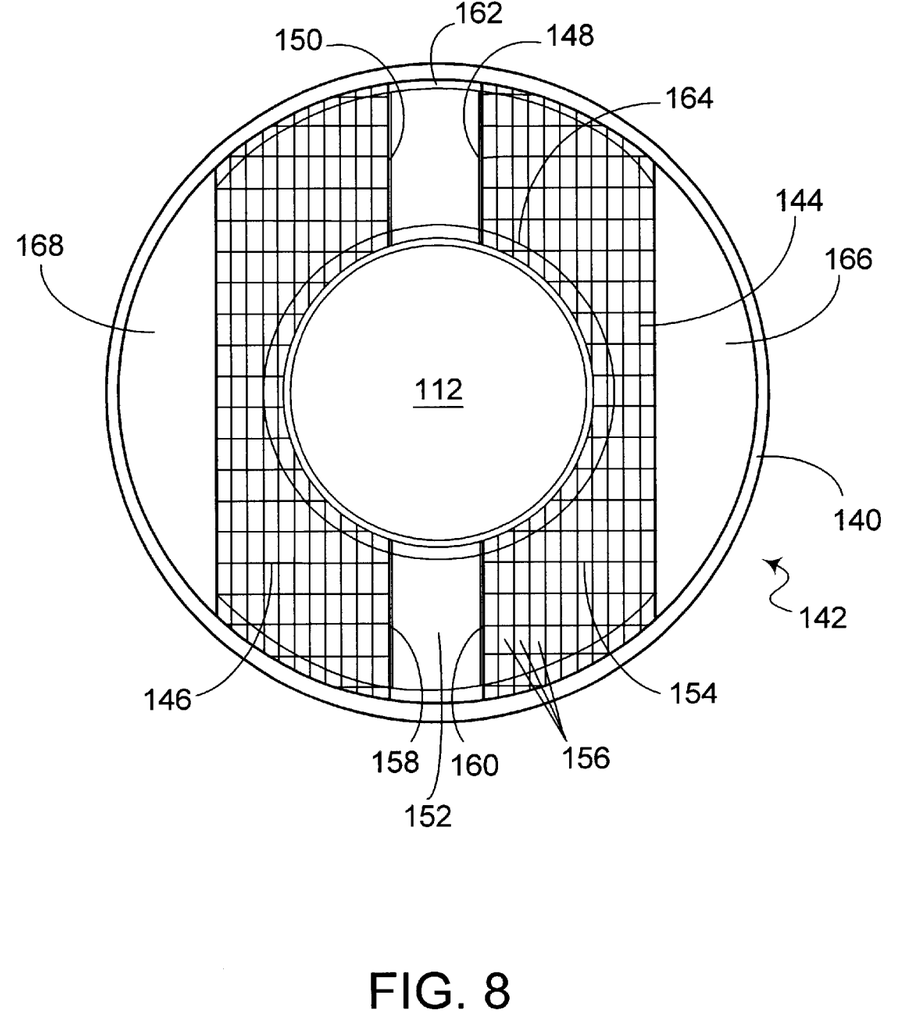
FIG. 8 is a cross-sectional view of a unitary baffle from the stripping vessel in FIG. 7 taken at segment 8—8 in FIG. 7.

FIG. 7 shows another embodiment of the present invention which could be used to replace the stripping zone 132 in FIG. 3. All elements in FIG. 7 that are not modified from FIG. 3 retain the same reference numeral designation. The stripping zone 140 has a series of two types of baffles which, in this case, are adapted for accommodating a riser 112 extending vertically through the center of the baffles in the stripping zone 140. The two types of baffles include a bifurcated baffle 142 and a unitary baffle 172. The bifurcated baffle 142 includes two perforated sections 144, 146 which each extend from opposite sides of the stripping zone 140 to internal edges 148, 150, respectively. The internal edges 148, 150 are spaced apart from each other to define a downcomer section 152 which extends radially from the upper riser 112 as best seen in FIG. 8. The perforated sections 144, 146 are shown to each comprise a grating 154 defining openings 156, which is explained with respect to FIG. 6. However, the perforated sections 144, 146 could comprise a plate with holes drilled therein as described with respect to FIG. 5. Each of the internal edges 148, 150 of the perforated sections 144, 146, respectively, includes an end plate 158, 160, respectively. As best seen in FIG. 7, the end plates 158, 160 extend downwardly to comprise a skirt that defines the space occupied by the downcomer section 152. The bifurcated baffle 142 is supported on the outside by an outer annular ledge 162 mounted on the inner wall of the stripping zone 140 and on the inside by an inner annular ledge 164 mounted on the outer wall of the riser 112. Lastly, the bifurcated baffle 142 comprises imperforate sections 166, 168 which are disposed vertically aligned with downcomer sections 178, 180, respectively, of the superjacent unitary baffle 172. In an embodiment, the imperforate sections 166, 168 comprise blank-off plates which are secured to and rest upon the perforated sections 144, 146, respectively.

Figure 9:
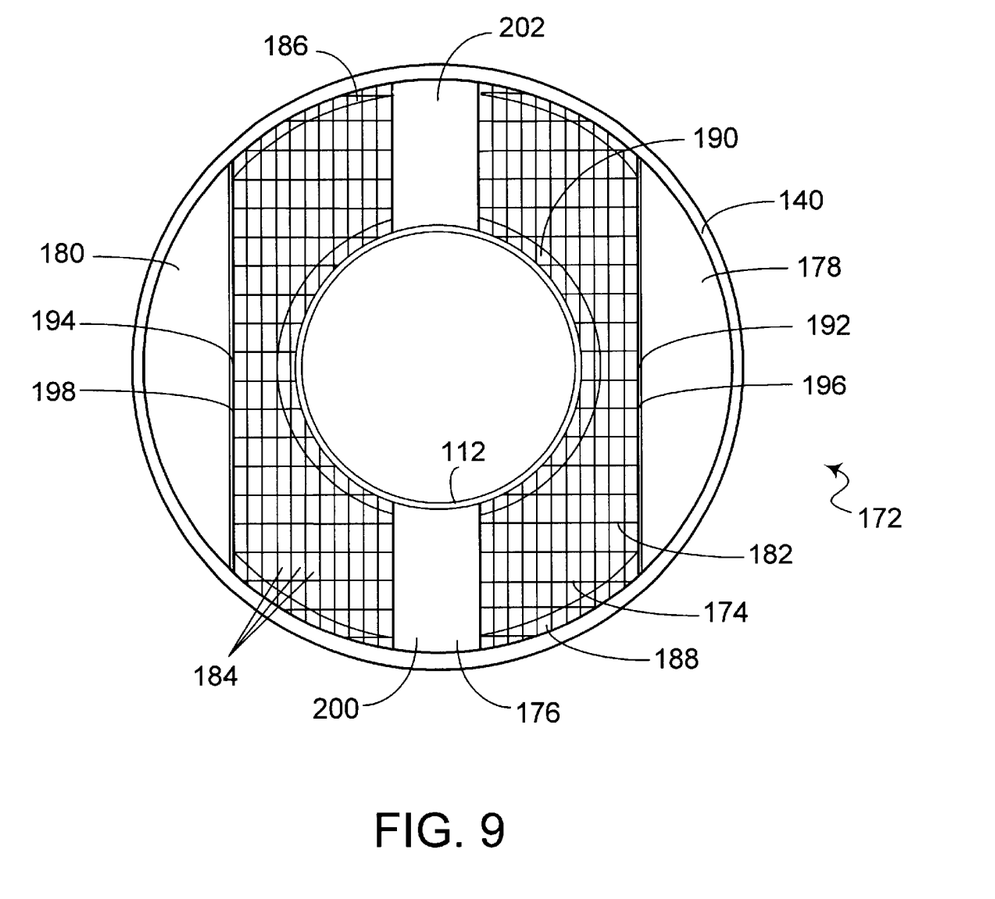
FIG. 9 is a cross-sectional view of a bifurcated baffle from the stripping vessel in FIG. 7 taken at segment 9—9 in FIG. 7.

The unitary baffle 172 comprises a unitary perforated section 174 depicted in FIG. 9 to comprise a grating 182 defining openings 184. The perforated section 174 may comprise openings drilled in a plate as explained with respect to FIG. 5. An outer edge of the perforated section 174 is supported by opposed annular ledges 186, 188, and an inner edge of the perforated section 174 is supported by an inner annular ledge 190 which circumscribes around and is supported by the outer wall of the riser 112. Transverse edges 192, 194 of the perforated section 174 are spaced apart from the inner wall of the stripping zone 140, so that the unitary baffle 172 does not extend across the entire cross-sectional area of the stripping zone 140 to define downcomer sections 178, 180, respectively. Skirts 196, 198 extend downwardly from the transverse edges 192, 194, respectively, to give depth to the downcomer sections 178, 180. The imperforate section 176 is shown in FIG. 9 to comprise two blank-off plates 200, 202 on opposite sides of the riser 112. The blank-off plates 200, 202 rest on top of the perforated section 174 and are secured thereto.

Figure 10:
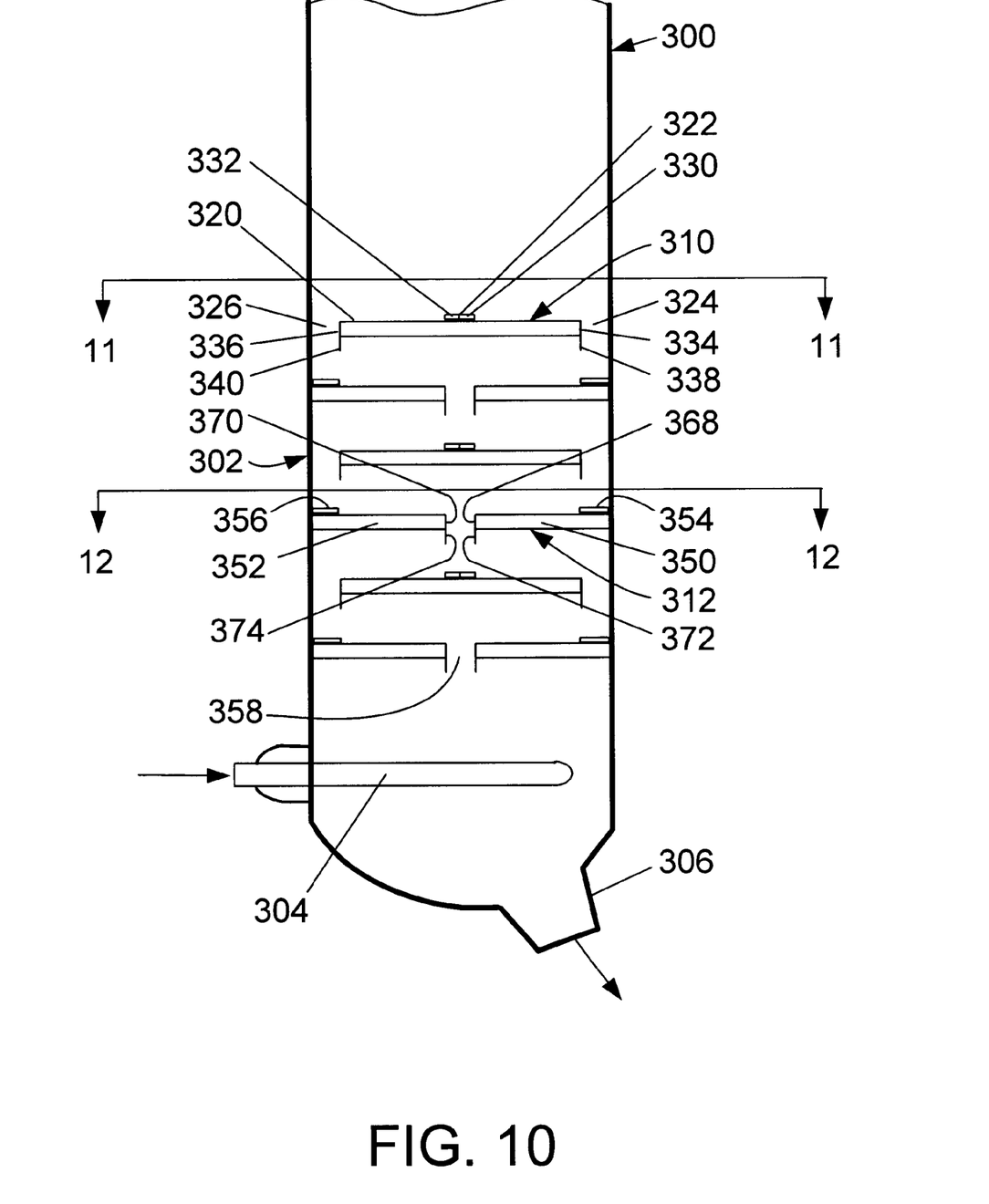
FIG. 10 is a partial schematic elevational view of a stripping zone of a further alternative arrangement for an FCC reactor.

FIG. 10 illustrates an additional embodiment of the horizontal baffles of the present invention in a reactor vessel 300 in which the contacting of the catalyst and the feed, separation of the cracked product and catalyst and stripping of the entrained product vapor from the catalyst all take place in the same reactor vessel 300. Only the stripping section 302 of reactor vessel 300 is shown in FIG. 10. Catalyst entrained with vapor product falls from the top of the reactor vessel 300 into the stripping section 302. Stripping medium such as steam is injected into the stripping section 302 by the distributor 304 and stripped catalyst exits the reactor vessel 300 through the outlet 306. Stripping section 302 comprises unitary baffles 310 and bifurcated baffles 312 in alternating series similar to that shown in FIG. 7 with the exception that there is no internal riser in reactor vessel 300. Unitary baffle 310 has a perforated section 320, an imperforate section 322 and opposed downcomer sections 324, 326.

Figure 11:
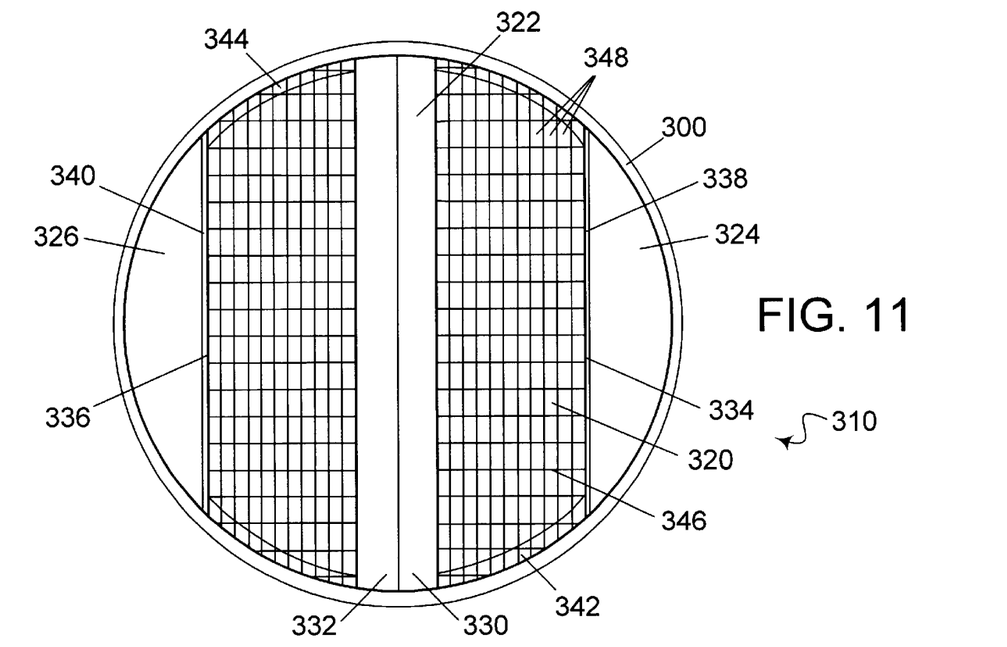
FIG. 11 is a plan view of a unitary baffle of FIG. 10 taken from segment 11—11 in FIG. 10.

The unitary baffle 310 is best shown in FIG. 11. The perforated section 320 comprises a grating 346 defining openings 348. Nevertheless, the perforated section 320 could comprise a plate with a plurality of holes drilled therein. The imperforate section 322 comprises two blank-off plates 330, 332 placed adjacent to each other. The blank-off plates 330, 332 rest upon and are secured to the perforated section 320. The perforated section 320 includes outer edges 334, 336 that are spaced apart from the inner wall of the reactor vessel 300. Skirts 338, 340 extend downwardly from the outer edges of the perforated section to provide depth to the downcomer sections 324, 326, respectively. Peripheral edges of the perforated section 320 are supported by annular ledges 342, 344 which oppose each other on opposite sides of the reactor vessel 300. The annular ledges 342, 344 are not shown in FIG. 10 for the sake of simplicity.

Figure 12:
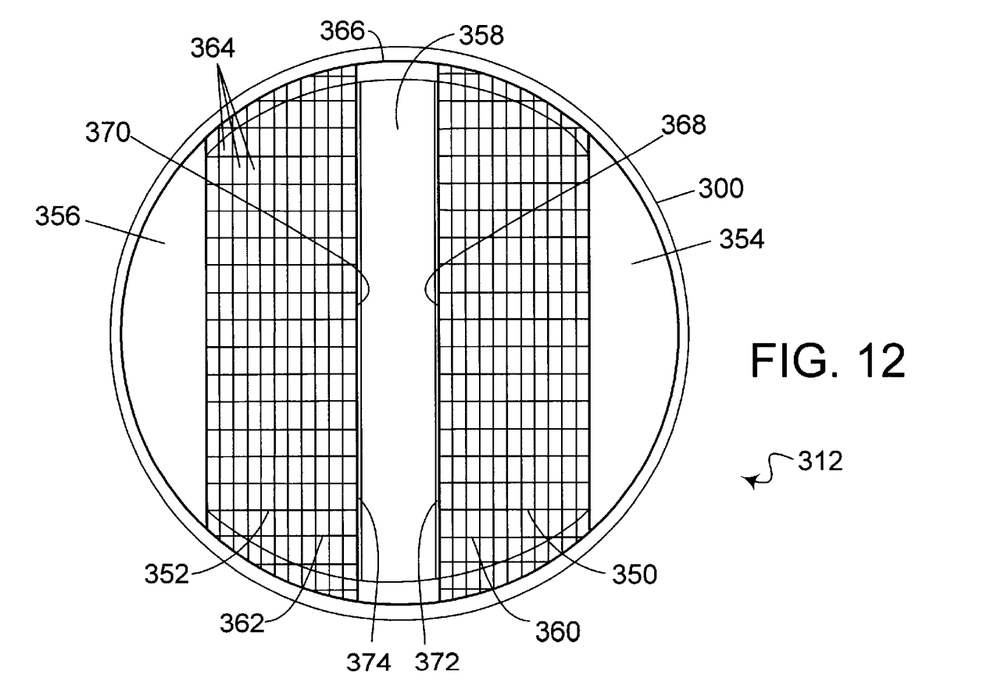
FIG. 12 is a plan view of the bifurcated baffle of FIG. 10 taken from segment 12—12 in FIG. 10.

The bifurcated baffle 312 is best shown in FIG. 12. The bifurcated baffle 312 comprises bifurcated perforated sections 350, 352, imperforate sections 354, 356 and downcomer section 358. Each perforated section 350, 352 comprises a separate grate 360, 362, respectively, defining openings 364 therein. Again, the perforated section may alternatively comprise a plate with holes drilled therein. Imperforate sections 354, 356 comprising blank-off plates rest upon and are secured to perforated sections 350, 352, respectively. The perforated sections 350, 352 are supported at the inner wall of the reactor vessel 300 by circumferential ledge 366 which is not shown in FIG. 10 for the sake of simplicity. The inner edges of the bifurcated perforated sections 350, 352 do not extend across the entire cross-sectional area of the reactor vessel 300. Inner edges 368, 370 of perforated sections 350, 352 are spaced apart to define the downcomer section 358. The downcomer section 358 of bifurcated baffle 312 is vertically aligned with the imperforate section 322 of baffle 310. Similarly, downcomer sections 324, 326 of unitary baffle 310 are vertically aligned with imperforate sections 354, 356 of bifurcated baffle 312. These arrangements facilitate transverse movement of the catalyst across the surface of the baffle. The inner edges 368, 370 of perforated sections 350, 352 include skirts 372, 374, respectively, which descend downwardly from the perforated sections 350, 352 to give depth to the downcomer section 358.

EXAMPLE

A series of tests was conducted to more fully demonstrate the unique and unexpected change in stripping performance that results from the use of horizontal baffles with downcomers over using conventional, sloped baffles. A test apparatus was constructed to measure conventional stripping performance from clear plastic panels to permit visual observation. The test apparatus modeled a 19° sector from a conventional cylindrical stripping arrangement similar to that shown in FIGS. 1 and 2 having a transverse cross-sectional area of about 0.19 m² (2 ft²). Inner and outer stripping baffles having a trapezoidal shape and a projected horizontal area of about 0.09 m² (1 ft²) were alternately placed at inner and outer locations of the apparatus to complete the model of a sector of a stripping vessel. A total of four effective outer baffles and three effective inner baffles were used with about a 97 cm (38 inch) spacing between adjacent outer baffles and between adjacent inner baffles. The leading edge of each baffle had a 7.6 cm (3 inch) vertical skirt. The apparatus had an additional baffle that was used for distribution purposes but were not part of the effective stripping operation. Overall the apparatus had a height of about 6 meters (20 feet), and the vertical height occupied by the baffles was 358 cm (11 feet 9 inches).

We also constructed a test apparatus embodying the stripping arrangement of the present invention as shown in FIG. 4 with horizontal baffles shown in FIG. 6. The test apparatus comprised a cylinder having a 61 cm (2 foot) diameter and having horizontal baffles with perforated sections comprising a grating, an open downcomer section and an imperforate section. Downcomer sections were equipped with 10 cm (4 inch) skirts so that the top of one baffle was 46 cm (18 inches) from the bottom of the skirt of the superjacent baffle. Seven baffles were installed in the cylinder and occupied by a vertical height of 246 cm (8 feet 1 inch). Overall, the height of the cylinder was 803 cm (26 feet 4 inches). Of each baffle, the downcomer section and the perforated section were 15 cm (6 inches) wide at their widest point and the perforated section was 31 cm (1 foot) wide at its shortest dimension and 61 cm (2 feet) wide at its widest dimension.

Both test apparatuses operated by circulating equilibrium FCC catalyst downwardly from a top inlet through the apparatus while air passed under the lowermost baffle upwardly through the baffles. The recovery of adsorbed hydrocarbons was simulated by injection of helium tracer into the circulating catalyst followed by measurement of the helium concentration in the recovered air. The stripped catalyst was recovered from the bottom of the test apparatus and the concentration was measured to determine the efficiency of the stripping operation. The air and helium along with entrained catalyst particle were recovered from the top of the apparatus and separated for recycle of the catalyst to the apparatus.

Figure 13:
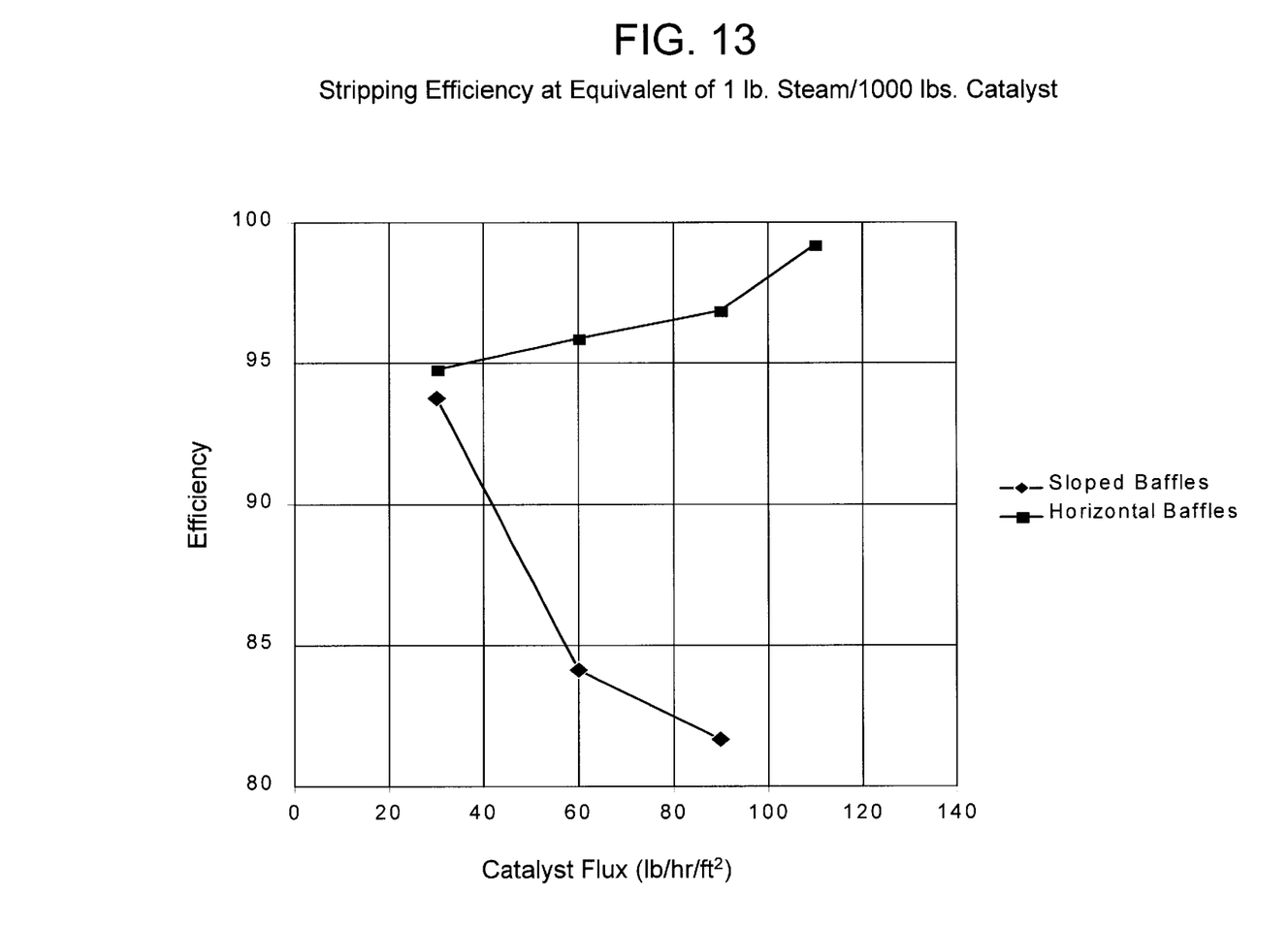
FIG. 13 is a graph comparing stripping efficiencies of a stripping vessel with conventional baffles to a stripping vessel with baffles of the present invention.

We compared the catalyst stripping efficiency to the catalyst flux of the conventional stripping vessel and the stripping vessel with horizontal baffles and downcomers of the present invention at a constant steam input of 1 kg of steam per 1000 kg of catalyst (1 lb. of steam per 1000 lbs. of catalyst). The comparison is illustrated in FIG. 13. It was observed that the stripping efficiency of the conventional stripping apparatus declined rapidly as the catalyst flux increased. However, we surprisingly found that the stripping efficiency of the horizontal baffles with downcomers of the present invention held a very high stripping efficiency even at low catalyst flux rates and that the stripping efficiency went even higher as catalyst flux increased. At a catalyst flux of 537,020 kg/hr/m² (110,000 lbs/hr/ft²), stripping efficiency was as high as 99.2%.

What is claimed is:

1. An apparatus for the stripping of entrained and/or adsorbed hydrocarbons from particulate material, said apparatus comprising:

a stripping vessel;

at least one port defined by the stripping vessel for receiving particles that contain entrained or adsorbed hydrocarbons from the contact of the particles with a hydrocarbon stream and for withdrawing stripping fluid and stripped hydrocarbons from the stripping vessel;

a plurality of stripping baffles spaced apart vertically over at least a portion of the stripping vessel height with each baffle having a slope of no more than 10° and each of said stripping baffles including an imperforate section and a perforate section, said baffles extending over less than the entire horizontal, cross-sectional area of said stripping vessel to define a downcomer section;

a plurality of openings distributed over the surface of the perforated section of each stripping baffle;

the imperforate section of a subjacent one of said baffles being vertically aligned with the downcomer section of a superjacent one of said baffles and vertically unaligned with the downcomer section of said subjacent one of said baffles;

at least one fluid inlet for passing a stripping fluid to the underside of at least one stripping baffle for stripping hydrocarbons from the particulate material; and at least one particle outlet for recovering stripped particles from the stripping baffles.

2. The apparatus of claim 1 wherein said baffle includes a perforated section and the openings are distributed over the entire surface of the perforated section of each stripping baffle to provide at least one opening for each 0.09 square meter (1 square foot) the surface of the perforated section of each baffle.

3. The apparatus of claim 1 wherein each of said stripping baffles comprises a grate.

4. The apparatus of claim 1 wherein said imperforate section and said downcomer section are on opposite sides of one of said baffles.

5. The apparatus of claim 1 wherein a weir extends upwardly from an edge of one of said baffles at the downcomer section.

6. The apparatus of claim 1 wherein a skirt extends downwardly from an edge of one of said baffles at the downcomer section.

7. The apparatus of claim 1 wherein one of said stripping baffles includes opposed, spaced apart internal edges to me said downcomer section.

8. An apparatus for the stripping of entrained and/or adsorbed hydrocarbons from particulate material, said apparatus comprising:

a stripping vessel;

at least one port defined by the stripping vessel for receiving particles that contain entrained or adsorbed hydrocarbons from the contact of the particles with a hydrocarbon stream and for withdrawing stripping fluid and stripped hydrocarbons from the stripping vessel;

a plurality of stripping baffles spaced apart vertically over at least a portion of the stripping vessel height with each baffle comprising an imperforate section and a grate section and said baffle extending over less than an entire horizontal, cross-sectional area of said stripping vessel to define a downcomer section;

the imperforate section of a subjacent one of said baffles being vertically aligned with the downcomer section of a superjacent one of said baffles and vertically unaligned with the downcomer section of said subjacent one of said baffles:

at least one fluid inlet for passing a stripping fluid to the underside of at least one stripping baffle for stripping hydrocarbons from the particulate material; and at least one particle outlet for recovering stripped particles from the stripping baffles.

9. A process for the stripping of entrained and/or adsorbed hydrocarbons from particulate material in a stripping vessel, said process comprising:

contacting particles with a hydrocarbon stream;

disengaging hydrocarbons from the particles after contact with said hydrocarbon stream to produce a stream of contacted particles containing entrained or adsorbed hydrocarbons;

passing the contacted particles downwardly through a plurality of stripping baffles, each baffle having a slope of less than or equal to 10° with respect to the horizontal and each of said stripping baffles including an imperforate section and a perforate section, said baffles extending less than across the entire cross sectional area of said stripping vessel to define a downcomer section, the imperforate section of a subjacent one of said baffles being vertically aligned with the downcomer section of a superjacent one of said baffles and vertically unaligned with the downcomer section of said subjacent one of said baffles;

discharging a stripping fluid upwardly through a plurality of openings distributed over the surface of the perforated section of each stripping baffle and stripping hydrocarbons from the particulate material;

recovering stripping fluid and stripped hydrocarbons from the stripping baffles; and recovering stripped particles from the stripping baffles.

10. The process of claim 9 wherein each baffle has perforated section and the openings are distributed over the entire surface of the perforated section to provide at least one opening for each 0.09 square meter (1 square foot) of the surface of the perforated section of each baffle.

11. The process of claim 9 wherein said stripping baffle comprises a grate.

12. The process of claim 9 wherein said stripping baffle includes opposed, spaced apart internal edges.

13. The process of claim 9 wherein said baffle is horizontal.

14. The process of claim 9 wherein said stripping baffle includes a weir at the downcomer section extending upwardly from an edge of said baffle.

15. The process of claim 9 wherein an edge of said stripping baffle is spaced apart from a near wall portion of said stripping vessel to define said downcomer section.

* * * * *